J. E. HALE.
CUSHION OR SOLID TIRE FOR VEHICLE WHEELS AND METHOD OF MAKING THE SAME.
APPLICATION FILED MAY 13, 1916.
1,319,864.
Patented Oct. 28, 1919.
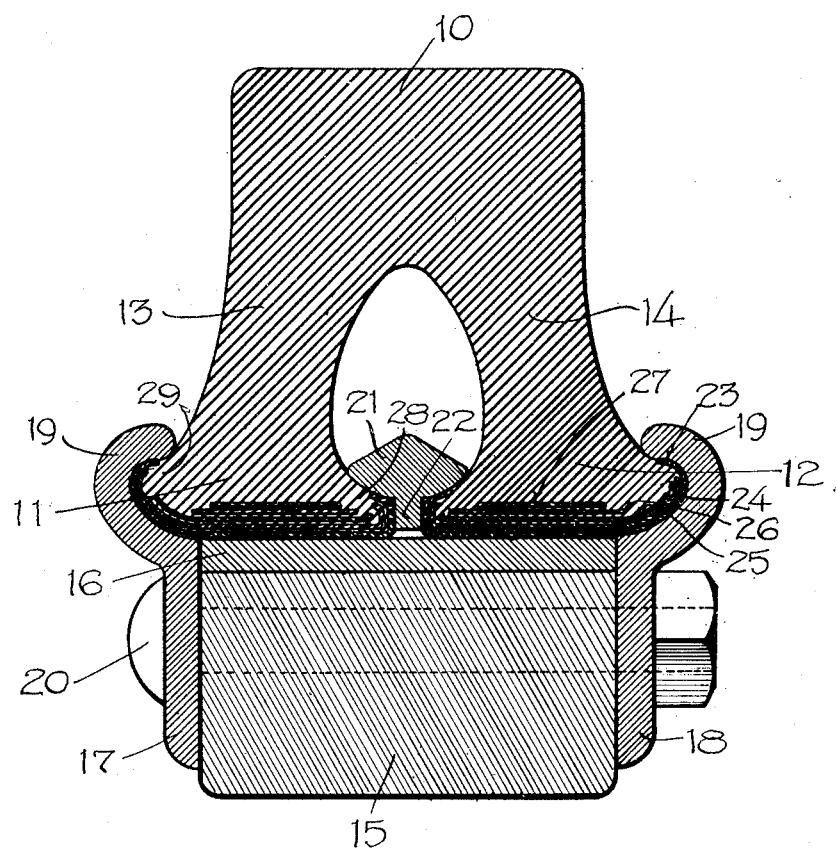
Witness
Inventor
James E. Hale.
By C. L. Landon.
Attorney

UNITED STATES PATENT OFFICE.

JAMES E. HALE, OF AKRON, OHIO, ASSIGNOR TO THE GOODYEAR TIRE AND RUBBER COMPANY, OF AKRON, OHIO, A CORPORATION OF OHIO.

CUSHION OR SOLID TIRE FOR VEHICLE-WHEELS AND METHOD OF MAKING THE SAME.

1,319,864. Specification of Letters Patent. Patented Oct. 28, 1919.

Application filed May 13, 1916. Serial No. 97,334.

*To all whom it may concern:*

Be it known that I, JAMES E. HALE, a citizen of the United States, residing at Akron, in the county of Summit and State of Ohio, have invented new and useful Improvements in Cushion or Solid Tires for Vehicle - Wheels and Methods of Making the Same, of which the following is a specification.

My present invention relates broadly to new and useful improvements in solid or cushion tires, but has particular reference to the provision of a novel base structure for tires of this character which are designed for detachable mounting upon their wheels, through the employment of clencher side flanges.

Solid or cushion tires which are arranged for this form of mounting are usually reinforced so that the base portion thereof is relatively rigid, permitting the tire to withstand the lateral compression of the clencher rings. A standing objection to this feature lies in the fact that the clencher side flanges frequently do not accurately register with the felly band of the wheel, and since the tire is rigidly reinforced, the tire base is subjected to unusual strains which affect the longevity of the tire.

On the other hand, if the tire base is made sufficiently yieldable to assume, without injury, the malformation demanded by any slight misplacement of the side flanges, its base is not sufficiently reinforced to maintain it upon the wheel rim in such manner that the strains occurring in the base are properly distributed throughout the tire body.

Accordingly, this invention has for its principal object the provision of a tire base structure capable of answering both of the difficulties above presented, inasmuch as a graduated reinforcement is provided for the tire which does not detract from the elasticity of the immediate face portion of the base, although providing for a reinforcement immediately behind the face which gradually diminishes from that point into the body of the tire.

As a preferred specific embodiment of the invention, I propose to reinforce the base of a solid or cushion tire with a plurality of fabric strips, the outermost strip of which is to be cured relatively soft to enable the tire to assume any shape required by the compression strains of the clencher rings; the next adjacent ply is to be cured hard to thoroughly reinforce the base and to impart the necessary stiffness thereto which will maintain it in place upon the wheel, while successively interior fabric plies are cured to varying degrees of hardness diminishing gradually toward the body of the tire.

I further propose to make the reinforcing fabric plies for the tire base of varying width so that the distribution of the strains incurred by the outermost plies will be graduated interiorly as well by the narrowing width of successively inner plies as by the diminishing degrees of hardness to which they are cured.

It is a still further object of the present invention to secure at a single vulcanization, the curing of a number of reinforcing fabric plies for a tire base to different and predetermined degrees of stiffness, which is to be accomplished by corresponding variations in the compounds employed to friction the respective plies.

The above and additional objects of a similar nature, which will be hereinafter more specifically treated, may be accomplished by such means as are illustrated in the accompanying drawings, described in the following specifications and then more particularly pointed out in the claims which are appended hereto and form a part of this application.

The figure of the drawing is a transverse section taken through a wheel rim, showing a cushion tire having its base constructed in accordance with my present invention as mounted thereon.

Before taking up the detailed description of my tire base structure, I desire to explain that the cushion tire shown is but one of many types of cushion and solid tires to which the principles of this invention may be applied.

The tire shown herein consists essentially of a tread portion 10, a pair of separated base portions 11 and 12, and intermediate tread supporting walls 13 and 14, which connect the bases to the tread portion.

The wheel illustrated in connection with the tire is of the standard S. A. E. type, embodying a felly 15; a felly band 16; a pair of clencher side flanges 17 and 18 having annular gripping portions 19 for engagement against the tire beads; and attaching bolts 20, which pass transversely through the felly and the attaching portions of the clencher side flanges for maintenance of the latter upon the rim.

Herein the separated base members of the tire are maintained in the proper spaced relation by a "floating" ring or annulus 21, the web 22 of which is inserted between, and is in contact with, the adjacent inner edges of the base members 11 and 12.

Each of the base members has embedded therein a plurality of fabric plies, here shown as five in number and respectively designated by the numerals 23, 24, 25, 26 and 27, arranged to be vulcanized into the bases to form integral parts thereof. This fabric is preferably of a heavy duck or canvas, such as is ordinarily used in making the carcass of a fabric tire.

The two base members 11 and 12 are similar in every respect, and the outer ply of fabric 23 of each is of a sufficient width to permit it to extend completely across the face of its base and to have its opposite edge portions turned to extend around the edges of the inner and outer beads or flanges 28 and 29. These outer plies of fabric, prior to their incorporation into the tire bases, are frictioned with a compound resulting in a relatively soft cure upon vulcanization and forming, as they do, the faces of their respective bases, they permit the latter to conform exactly to the shape required by the position of the clencher flanges 17 and 18, even if misadjusted. Since the apertures in these flanges through which the bolts 20 pass frequently become oversized by wear, it will be apparent that the inner edges of the annular attaching portions 19 may ride somewhat above, or fall somewhat below the edge of the felly band 16, so that the soft outer ply becomes an important factor in properly seating the tire upon its wheel rim. A further feature of considerable importance resides in the extension of the edge portions of these outer plies around the beads 28 and 29, inasmuch as exposure of the rubber stock to chafing by the clencher flanges and the ring 21 is prevented.

Each of the interior fabric plies 24 adjacent the face plies 23 is somewhat narrower than the corresponding outer ply and is applied to the base in such manner that its edge portion is turned to lie equidistantly at all corresponding points from the edge portions of the first plies. These second plies are frictioned with a compound of such constituency that they will be cured to the maximum degree of stiffness of all the fabric plies employed.

The remaining three plies 25, 26 and 27 of each base portion are successively narrower in width and are also treated with frictioning compounds of such varying natures as to cure these plies to respective degrees of stiffness diminishing interiorly of the base from the maximum presented by the second plies 24.

In a modified form of my invention, I provide a tire base reinforced by successive plies of fabric in much the same manner as that which has already been described, but with the exception that while the outermost ply is so frictioned as to cure relatively soft, the succeeding inner plies are so frictioned in pairs that the second and third plies will cure to the same degree of maximum stiffness while the fourth and fifth plies will be both cured to a degree of stiffness equaling that of the rubber stock composing the body of the tire.

In any case, a single vulcanization is sufficient to cure all of the reinforcing fabric plies simultaneously since the desired degree of stiffness for each of the plies is predetermined by the constituency of the rubber compound with which it is frictioned prior to its incorporation into the tire base.

It should be apparent from the foregoing description that a tire constructed according to the present invention is capable not only of conforming exactly to the shape demanded by the particular means employed to maintain it upon its wheel rim, but it is also so reinforced as to render the most efficient service. In addition this reinforcement is of such nature as to distribute the strains incurred by the base throughout the body of the tire, both by the varying degrees of stiffness to which the reinforcing plies are cured and also by the various widths of fabric, according to the specific requirements of the particular type of tire to which the present invention may be applied. If so desired, all of the fabric plies may be cured to the same degree of stiffness, in which case the diminutions in stiffness, from a maximum at the base to a minimum at a junction with the body of the tire will be partially provided for by the diminution in the width of the fabric plies from the base face toward the tread.

I have discovered that the distribution of strains and stresses occurring in the base is one of the principal advantages of the present tire base construction, and that the method and means of stiffening or reinforcing the base are not only simple and cheap but result, in addition, in the maintenance of the tire so firmly in place upon its wheel rim that its longevity is increased to a considerable extent.

What I claim is:

1. In a base for tires, fabric plies incorporated into the base and respectively frictioned with rubber compounds of varying compositions of such nature that the vulcanizing of the tire results in the curing of the fabric plies to predetermined varying degrees of stiffness.

2. In a base for tires, a plurality of fabric plies embedded in the base and respectively frictioned by rubber compounds of individual character, whereby a single vulcanization of the tire base will simultaneously cure the frictioning compounds of successive plies to individual degrees of stiffness variously diminishing inwardly from a maximum stiffness adjacent the face of the tire base.

3. In a base for tires, a fabric ply exposed to reinforce the face of the tire base throughout its entire width, and fabric plies embedded within said base, respective plies being respectively frictioned by rubber compounds of differing composition, whereby the exposed fabric ply may be cured at once to a lesser degree of stiffness than the embedded fabric plies, and by a single vulcanization of the tire base.

4. That method of constructing a tire base comprising the following steps: (a) the embedding of fabric plies within the tire base after the said plies have been respectively frictioned by rubber compounds of varying compositions; and (b) the vulcanization of all the plies simultaneously with the base to cure the frictioning compounds of the plies to varying degrees of stiffness determined by the composition of each compound.

5. In a base for tires, a plurality of fabric plies embedded in the base and frictioned with varying rubber compounds, said plies diminishing in width from the face of the tire base toward the tread, and said rubber compounds upon curing making the respective plies of various degrees of stiffness diminishing from the base interiorly toward the tread, all as means of distribution over the body of the tire strains occurred by the base.

In testimony whereof I have signed my name in the presence of two subscribing witnesses.

JAMES E. HALE.

Witnesses:
H. J. GINTHER,
C. V. P. NEWBOLD.

Copies of this patent may be obtained for five cents each, by addressing the "Commissioner of Patents, Washington, D. C."